(12) United States Patent
Mikuskiewicz et al.

(10) Patent No.: US 11,807,813 B2
(45) Date of Patent: Nov. 7, 2023

(54) INSTALLATION FOR THE PRODUCTION AND A METHOD OF PRODUCING OIL, GAS AND CHAR FOR A COAL BLACK FROM ELASTOMERS, ESPECIALLY RUBBER WASTE, IN THE PROCESS OF CONTINUOUS PYROLYSIS

(71) Applicant: REOIL SP. Z O.O., Myslenice (PL)

(72) Inventors: Michal Mikuskiewicz, Chrzanow (PL); Pawel Mikuskiewicz, Cracow (PL); Sebastian Zygmunt, Chrzanow (PL); Bronislaw Rolnik, Kedzierzyn-Kozle (PL)

(73) Assignee: REOIL SP. Z O.O., Myslenice (PL)

( * ) Notice: Subject to any disclaimer, the term of this patent is extended or adjusted under 35 U.S.C. 154(b) by 0 days.

(21) Appl. No.: 17/764,577

(22) PCT Filed: Sep. 29, 2020

(86) PCT No.: PCT/EP2020/077259
§ 371 (c)(1),
(2) Date: Mar. 29, 2022

(87) PCT Pub. No.: WO2021/063961
PCT Pub. Date: Apr. 8, 2021

(65) Prior Publication Data
US 2022/0372374 A1    Nov. 24, 2022

(30) Foreign Application Priority Data

Sep. 30, 2019   (PL) .......................................... 431333

(51) Int. Cl.
*C10B 53/07*   (2006.01)
*C10B 47/44*   (2006.01)
(Continued)

(52) U.S. Cl.
CPC .............. *C10B 53/07* (2013.01); *B01D 53/48* (2013.01); *B01D 53/78* (2013.01); *C01B 32/324* (2017.08);
(Continued)

(58) Field of Classification Search
CPC .. C10G 1/002; C10G 1/10; C10G 2300/1003; C10B 53/07; C10B 47/44; C01B 32/324; B01D 53/48; B01D 53/78
See application file for complete search history.

(56) References Cited

U.S. PATENT DOCUMENTS 4,284,616 A   8/1981   Solbakken et al.
4,740,270 A   4/1988   Roy
(Continued)

FOREIGN PATENT DOCUMENTS

CA   1334433 C   2/1995
CA   2944852 C   5/2022
(Continued)

*Primary Examiner* — Timothy C Vanoy
(74) *Attorney, Agent, or Firm* — Dickinson Wright PLLC; Andrew D. Dorisio

(57) ABSTRACT

An installation for the production of oil, gas and char for carbon black, from elastomers, characterized in that, it has a screw dispenser (3) with a shaft (1), which from the loading side is closed hydraulically with a lock (2) by a nitrogen, a reactor (4), which is divided into zones A, B, C, corresponding to the subsequent stages of the pyrolysis process: zone A—the beginning of depolymerization (350° C.), zone B—carbonization (350-400° C.) and zone C—aromatic compounds cracking (400-650° C.), while a bubbler (5) hydraulically closed with a siphon (6) and a separator (7) with a hydraulic closure (8) and an oil separator (9) equipped with a transport screw (10) and an afterburner chamber (20) are installed outside the reactor (4), wherein the oil separator (9) is closed at the outlet by an accumulation shaft (12) and from the side of receiving a solid product—with a shaft (13),
(Continued)

which is connected by an U-shaped screw conveyor (14) with economizers (11) and (15). wherein the installation is provided with a scrubber (16).

4 Claims, 2 Drawing Sheets

(51) Int. Cl.
    C10G 1/00      (2006.01)
    C10G 1/10      (2006.01)
    C01B 32/324    (2017.01)
    B01D 53/48     (2006.01)
    B01D 53/78     (2006.01)
(52) U.S. Cl.
    CPC .............. *C10B 47/44* (2013.01); *C10G 1/002* (2013.01); *C10G 1/10* (2013.01); *C10G 2300/1003* (2013.01)

(56) References Cited

U.S. PATENT DOCUMENTS

| | | | |
|---|---|---|---|
| 5,158,983 A * | 10/1992 | Stapp | C10G 1/10 208/18 |
| 5,395,404 A * | 3/1995 | Burckhalter | C10B 53/07 202/98 |
| 5,744,668 A | 4/1998 | Zhou et al. | |
| 7,947,248 B2 | 5/2011 | Hamby et al. | |
| 9,200,162 B2 | 12/2015 | Taylor | |
| 9,376,625 B2 | 6/2016 | Taylor | |
| 9,580,606 B2 | 2/2017 | Verberne | |
| 10,023,804 B2 | 7/2018 | Taylor | |
| 10,119,031 B2 | 11/2018 | Verberne | |
| 10,190,054 B2 | 1/2019 | Taylor | |
| 10,329,489 B2 | 6/2019 | Taylor | |
| 2002/0094315 A1 * | 7/2002 | Mengel | C09C 1/482 423/460 |
| 2006/0280669 A1 * | 12/2006 | Jones | C10B 53/02 202/136 |
| 2011/0136971 A1 * | 6/2011 | Tucker | C10G 1/002 977/788 |
| 2012/0010450 A1 | 1/2012 | Taylor | |
| 2016/0017232 A1 | 1/2016 | Ullom | |

FOREIGN PATENT DOCUMENTS

| | | | | |
|---|---|---|---|---|
| CN | 2223297 Y | 3/1996 | | |
| CN | 206089578 | 4/2017 | | |
| CN | 207749086 | 8/2018 | | |
| CN | 111234858 A | 6/2020 | | |
| DE | 19522457 A1 | 9/1996 | | |
| DE | 102014015281 A1 | 4/2015 | | |
| EP | 2480633 A1 | 8/2012 | | |
| EP | 3 627 050 A1 * | 3/2020 | .............. | F23K 1/04 |
| JP | H0940969 A | 2/1997 | | |
| JP | 2021522085 A | 8/2021 | | |
| PL | 217003 B1 | 6/2009 | | |
| PL | 218771 B1 | 10/2009 | | |
| PL | 392199 A | 8/2010 | | |
| RU | 2013126238 A | 12/2014 | | |
| WO | WO 2011 035 812 A1 * | 3/2011 | ............. | C10B 53/07 |
| WO | WO 2011 085 508 A1 * | 7/2011 | ............. | C10G 1/10 |
| WO | 2012072842 A1 | 6/2012 | | |
| WO | WO 2013 095 145 A1 * | 6/2013 | ............. | C09C 1/48 |

* cited by examiner

INSTALLATION FOR THE PRODUCTION AND A METHOD OF PRODUCING OIL, GAS AND CHAR FOR A COAL BLACK FROM ELASTOMERS, ESPECIALLY RUBBER WASTE, IN THE PROCESS OF CONTINUOUS PYROLYSIS

TECHNICAL FIELD

The subject of the invention is an installation for the production of oil, gas and carbon black raw material, as well as a method of production of the aforementioned products from elastomers, especially rubber waste, in the process of continuous pyrolysis.

BACKGROUND

For many years scientists and entrepreneurs have been dealing with the problem of recycling rubber waste, especially car tires. Over a billion tires in cars are replaced worldwide every year, generating over 13 million tonnes of waste. As a result of recycling this waste, apart from the obvious environmental benefits, it is possible to obtain a full-value solid (carbon black), liquid (oils) and gaseous (gas) products.

In general, the recycling process has already been extensively described in the literature. Shredded tires are subjected to very high temperatures in reactors, and then individual hydrocarbon fractions are obtained in the distillation process and coal is separated.

SUMMARY

Methods and installations for the treatment of waste, especially car tires, have been described in many inventions.

The Chinese Patent document No. CN2223297 describes a method of producing gasoline, diesel fuel and carbon black using a heating furnace, cracking reactor, spiral conveyor, desulfurization dechlorination tank, separator, heat exchanger, fractionating column and a water separator. The casing houses a reaction vessel with a propeller stirrer, the heating furnace with an exhaust gas outlet from the reactor, and the exhaust gases are supplied through the heat exchanger pipe. The reactor contains a bottom carbon black exhaust valve and in the upper part the material is transported through a pipe to a condenser and the separator. A heat pump and a buffer tank are connected to the outlet pipe of the fractionating column, in the center of which there is the connection to the upper gas outlet of the condenser, the diesel fuel-water separator and the gasoline tank, and the diesel fuel-water separator and the diesel fuel tank, and the separator is connected to the upper gas storage chamber. The patent does not describe the details of the production line and technological process.

A method of producing gasoline, diesel oil and carbon black using waste rubber (including tires) and/or plastic waste (including PVC) is disclosed in the U.S. Pat. No. 5,744,668. The process includes pyrolysis, desulfurisation and/or denitrification and/or dechlorination, as well as catalytic cracking. According to the invention, waste rubber and/or plastic waste are loaded into a pyrolysis reactor containing a spiral agitator, a screw conveyor or a piston conveyor. After completion of the pyrolysis reaction, the carbon black formed is discharged from the pyrolysis reactor vessel by means of a spiral agitator. The other formed gas phase substances which have low molecular weight are subjected to a denitrogenization step and/or a dechlorination and desulfurization step. Residual sulfur, nitrogen and chlorine are removed through the fixed bed and catalytic cracking is simultaneously performed. The gaseous materials enter the catalytic cracker to undergo the catalytic cracking reaction. Substances produced by catalytic cracking are separated to obtain the desired products. The spiral agitator placed in the pyrolysis reactor, according to the invention, reduces the coking of reacting substances and improves the heat conduction efficiency. Moreover, the agitator rotates clockwise during the pyrolysis reaction, but drains the carbon black away when it rotates counterclockwise. The invention uses a special catalyst, and the desulfurization and/or denitrification and/or dechlorination equipment extends the life of the catalyst, hence the range of processed materials is wider (almost all plastics and rubbers).

The Japanese Patent No. JPH0940969 describes a method for an apparatus unit for recovering light oil from used tires. The device consists of a catalyst, a reactor, a funnel, carbonization pyrolysis furnaces, a suction blower, a condenser, an oil tank, a compressor, an air heater, an exhaust gas treatment device, and tanks for the remaining thermal decomposition product.

The U.S. Pat. No. 7,947,248 discloses a system in which used tires are placed in a porous container which is adapted to pass a convective stream of not containing oxygen gas through them, and then the container is placed in a thermal pyrolysis processor, properly sealed, where the waste is heated with a convective gas stream to carbonize the material, and then the material is cooled, separating individual fractions such as carbon black, oil, gas and, as the inventors undoubtedly noticed—a recyclable metal product (which is also a component of tires).

The PCT patent application no. WO2012072842 describes a cyclic reactor with an oven and muffles, a liquid fraction condensation unit, a gas filter unit and a gas conditioning unit, where the reactor consists of a set of vertical cylinders with openings at both ends with sealed gates, wherein the top gate is an entrance of a granular tire, and a lower gate has a diffuser integrated with a gasifying agent for the gasification operation, while the carbon residue can be removed through the lower reactor gate by a gravitational discharge into a collecting compartment where it is cooled and then stored or processed into further products. The reactor furnace is equipped with gas burners and has a connection in the lower middle part for the use of exhaust gases from a generator or a turbine engine. The furnace has an internal path to use the heat, wherein at the end of this path there is a residual heat output, with a butterfly valve, to regulate the output depending on the operating burners. The cells have automatic temperature and pressure control systems. The condenser, according to the invention, consists of two groups of special heaters. The first group is air-cooled at room temperature. The second group is cooled by the refrigerator. Outgoing gases from the reactor with an initial temperature of 300° C. are gradually cooled as they pass through special groups of heaters finally reaching a temperature of about 5° C. Consequently, non-condensable gases are separated from the condensers, producing a liquid fraction or oil which is gravitationally collected in several tanks. In the distillation step, the non-condensable gases are filtered and conditioned by a filter system and treated with chemicals to remove sulfur and other elements from the gas, as well as particles larger than 10 μm (15), and the gas is used in a generator or a turbine engine, and this gas can also power oven burners. In the event of an engine failure, said gas will be taken to the safety burner where the gases will burn.

The Canadian Patent No. CA1334433 discloses a method of separation of commercially valuable chemicals from pyrolysis oils derived from tires, and a method for obtaining oils and carbon black. The method of producing carbon black by vacuum pyrolysis of used rubber tires according to the invention comprises pyrolysing of the used rubber tire material at a temperature in the range of about 490° C. to about 510° C. under an absolute pressure of less than about 5 kPa, and recovering a carbon black solid material with an iodine adsorption number of about 130 to about 150 mg.

The U.S. Pat. No. 4,740,270 discloses a method for treating used rubber tires by vacuum pyrolysis in a reactor for producing liquid and gaseous hydrocarbons, and solid carbon material. According to the invention, pyrolysis of tires is carried out at a temperature ranging from about 360° C. to about 415° C., under a pressure lower than atmospheric pressure by about 35 mm Hg and such that the gases and vapours generated in the reactor have a residence time of a few seconds. The process of the invention makes it possible to increase yield of liquid hydrocarbons and reduce yield of gaseous hydrocarbons and solid carbon material, thereby producing hydrocarbon oils with basically maximum yield. These hydrocarbon oils have a high calorific value and are therefore suitable for use as a heating fuel.

The German patent DE19522457 describes a method and a system improving the efficiency of pyrolysis, the advantage of the invention indicates that the pyrolysis process with the use of the pyro gas formed and the treatment of the gas for indirect heating of the reactor is energetically favourable, indicating an efficiency of over 80%, and by directing part of the exhaust gas to the atmosphere, both gas storage and burning of its excess in a flare are eliminated. The essence of the invention is the process consisting in heating the pyrolysis gas in the reactor, to which heat is supplied directly with a separate oil/gas burners to the temperature of 850 C, afterburning of the gas in the combustion chamber for approx. 2 s and mixing it with the exhaust gases, then the mixture is cooled to a temperature of 550-650 C and directed to indirect heating of the reactor jacket. The authors complete the description of the system with pressure regulation by means of a signal from the reactor to the suction fans, desulphurization of the gas with a leaching wash, the use of two suction fans for gas transport and pressure boosting, and directing the gas to the engine or gas turbine.

However, the systems and processes proposed by the inventors of the above-mentioned inventions are described very generally. The systems use typical devices without specifying technical parameters, which was reflected in the lack of formulation of patent claims concerning the device, such as e.g. in the German patent. Thus, it should be stated that the described systems are only an illustrative example of the implementation of inventions, and usually the inventors focused their attention on the description of the occurring physic-chemical phenomena. In fact, it is impossible to build a system (device) according to the indicated inventions, in a way that the goal set by the inventors can be achieved, because there are a number of technical disadvantages, e.g. blocking the flow of technological streams in the devices selected for implementation, which cause that the described processes do not to follow the theory described.

As the most commonly used rubber waste are car tires, the present inventors have developed a device in the form of a technological line employing a continuous pyrolysis process, where the end result is carbon black and a hydrocarbon fraction, which depending on the further processing method, are used in the rubber industry, other elastomers, thermoplastics, as well as in chemistry and power engineering.

A typical production line consists of the rubber material mills shredding into a few centimetres pieces, a raw material dispenser (receiver), reactor, separator, oil separator, air pumps, compressor, combustion chamber, fans and a distillation column.

The devices known so far used a screw receiver, a shaft, a screw conveyor, in which the raw material was cooled through the casing jacket, the conveyor shaft and the surfaces of the screw, a lock, and a reactor made in the form of a sealed chamber.

However, the known technological lines have a number of drawbacks and disadvantages, which significantly lengthen the production process and increase its costs.

For example, in the case of the reactor, its closed structure made it impossible to carry out technical efficiency control from inside, e.g. wall thickness loss, inspection of welds, disassembly or replacement of worn parts from the inside, and the lack of possibility of cleaning and removal of sediments.

Also, the vapour pipe through which hydrocarbons from the reactor are discharged to the cooler, is usually constantly covered with carbon material and bitumen, which forces the process to be stopped for the purpose of cleaning, and additional stops generate a carbon layer on the reactor walls, which effectively blocks heat transfer to the pyrolysis process.

DETAILED DESCRIPTION

The object of the invention is to eliminate the observed disadvantages and to develop an installation and a method which will enable the efficient operation of the installation and obtain high-quality end products.

An Installation according to the invention consists of a screw dispenser 3 with a shaft 1, which from the loading side (a) is closed hydraulically with a lock 2 by nitrogen (b), which displaces air in the feed step and prevents backflow of the reactor contents to feed (a), in which the feed (a) moves in the reactor counter-current to the direction of a heating medium flow, wherein the reactor 4 is divided into zones A, B, C, corresponding to the subsequent stages of the pyrolysis process: zone A—below the temperature corresponding to the beginning of depolymerization (350° C.), zone B—carbonization temperature (350-400° C.), zone C—aromatic compounds cracking temperature (400-650° C.), and wherein in order to prevent pressure build-up in the reactor, a bubbler 5 hydraulically closed with a siphon 6 is installed as a separate reactor 4 element, and in order to discharge gaseous products from the reactor 4 at a temperature of 450° C., a separator 7 with a hydraulic closure 8 to prevent hydrocarbons having a boiling point of over 360° C. and a carbon black being returned to the pyrolysis zone from the side of the gaseous product, from rising, and in order to additionally pyrolyze the char a hydrocarbons oil separator 9 equipped with a screw conveyor 10 and heated by exhaust gases fed directly from the pyrolysis gas afterburning chamber 20 having temperature 850° C. supplied with pyrolysis gas (r), is installed, wherein it is closed at the outlet by an accumulation shaft 12 which is pneumatically closed from the side of receiving a solid product with a shaft 13, and then the oil-free char is transported by a U-shaped screw conveyor 14 raised for further processing into carbon black (n), while exhaust gases downstream of the reactor 4 are transported to two economizers 11 and 15 optimizing the exhaust gases heat in the combustion chamber 20 and in the zone heating jacket of the reactor, while gas-liquid (m) pyrolysis products from the separator 7 are directed to the scrubber 16, which is designed to separate gas-liquid pyrolysis products into: gasoline fraction (d), medium oil fraction (e) and the rest of the heavy residue above the temperature of 360° C. (f), and to a vacuum pump 18 which controls the pressure in the scrubber 16. In a preferred embodiment employing a distillation column 17 the vacuum pump 18 is, in the same time, an element that allows to advantageously separate the components of the high-boiling residue (above 360° C.). An injector 19 mediates in directing the non-condensable components (p) to a compressor 23 and a gas buffer tank 24, if no desulfurization occurs.

In an embodiment, the installation may be equipped with a pyrolysis gas desulphurization system consisting of an injector 19, chemisorption column 21, downstream of which the desulphurized gas (r) is directed to the pyrolysis gas combustion chamber 20 if there is no compression in the system comprising the compressor 23, the buffer tank 24 and an expander 25, and reagents are directed from the chemisorption column 21 into an alkaline solution tank 22.

The method, according to the invention, involves preparation of scraps of car tires, usually containing up to 4% of steel, which are fed to the reactor 4 through the screw dispenser with the shaft 1, using the hydraulic safety lock 2 shutting off gases from the reactor from the feed line, wherein nitrogen is constantly introduced into the dispenser to displace air and prevent backflow of material from the reactor 4 to the dispenser 1, wherein the nitrogen is introduced into the reactor 4 in order to eliminate the oxidation of the char, then the material under slight overpressure is moved through individual zones A, B, C of the reactor 4 counter-current to the direction of a heating medium flow, then the material descends from the bottom to the crude coal oil separator 9 heated by exhaust gases fed directly from the pyrolysis gas afterburning chamber 20 in temperature 850° C. in order to additionally pyrolyze the char, which, after accumulation, is transported by an elevated screw conveyor 10, from the top, wherein in case of remaining part (m), the fraction with a boiling point of over 360° C., is returned to the pyrolysis zone from the side of the receiving of the gaseous product through a separator 7 provided with a hydraulic closure 8 in order to prevent hydrocarbons and carbon black rising, and the major part of hydrocarbons is taken to a scrubber 16 or, in another embodiment, to a distillation column 17. During the production process economizers 11 and 15 organize the optimization of the use of exhaust gases heat from a combustion chamber 20. In the scrubber 16 (or in the distillation column 17) the pyrolysis gas is separated into fractions: gasoline fraction, medium oil fraction and the rest of the heavy residue above the temperature of 360° C., wherein the pressure in the scrubber 16 or in the distillation column 17 is controlled by a vacuum pump 18, and if the column 17 is used, vacuum pump 18, is in the same time an element that allows for the advantageous separation of the high-boiling residue (above 360° C.) components, while the pyrolysis gas downstream of the vacuum pump 18 is directed to the injector 19 fed either with a stream of water, which simultaneously cools the gas and causes the condensation of oil components that contaminate the combustion chamber 20 and cause the increase of NOx or an alkaline aqueous solution taken from the solution buffer tank 22, causing simultaneous desulfurization in the column 21 in the chemisorption process, and from there into the combustion chamber 20 either directly or via a compressor 23, a gas buffer tank 24 and an expander 25.

BRIEF DESCRIPTION OF THE DRAWINGS

The subject of the invention is shown on the drawing which

Figure 1:
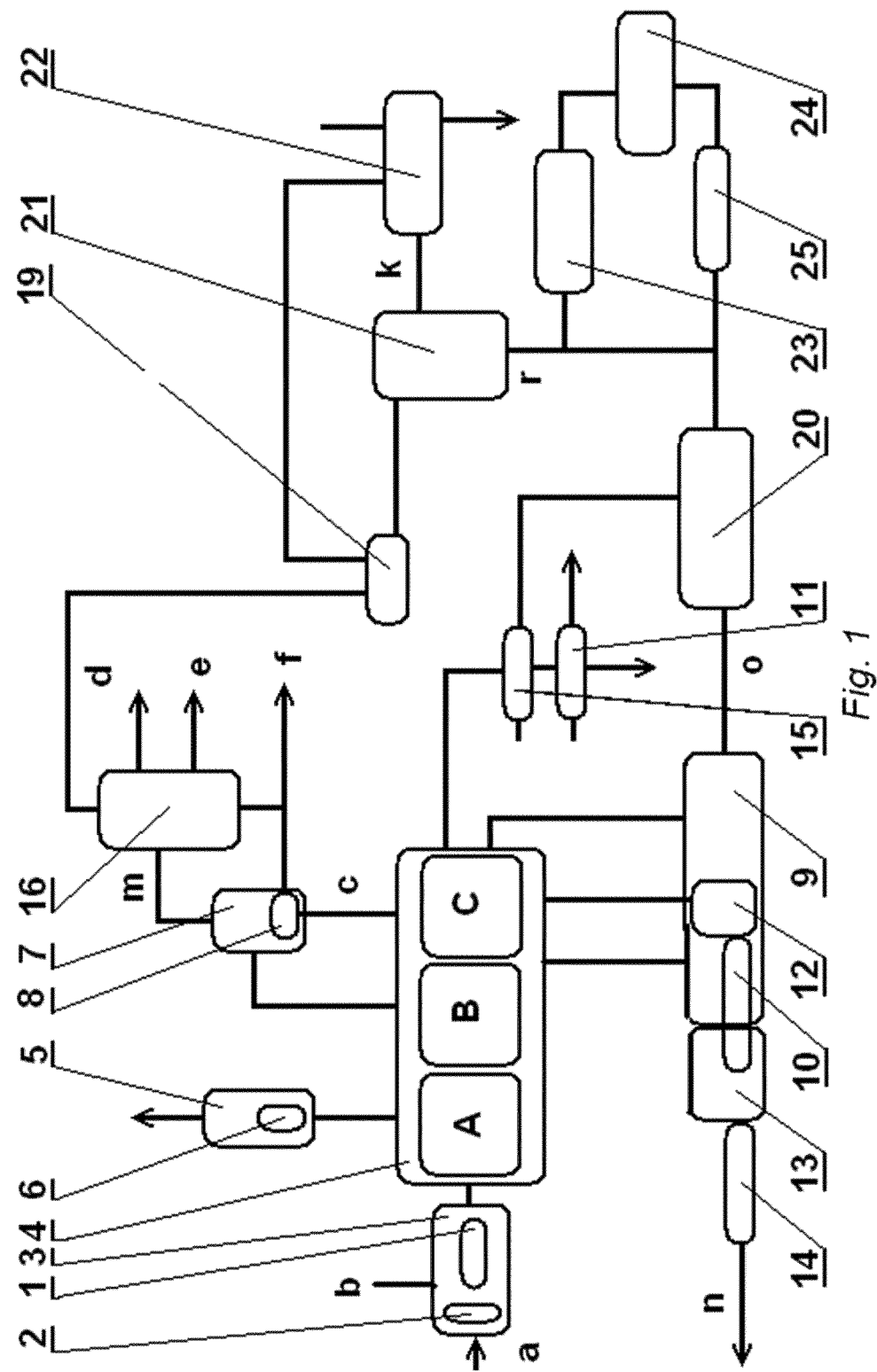
FIG. 1 shows an installation diagram.
Figure 2:
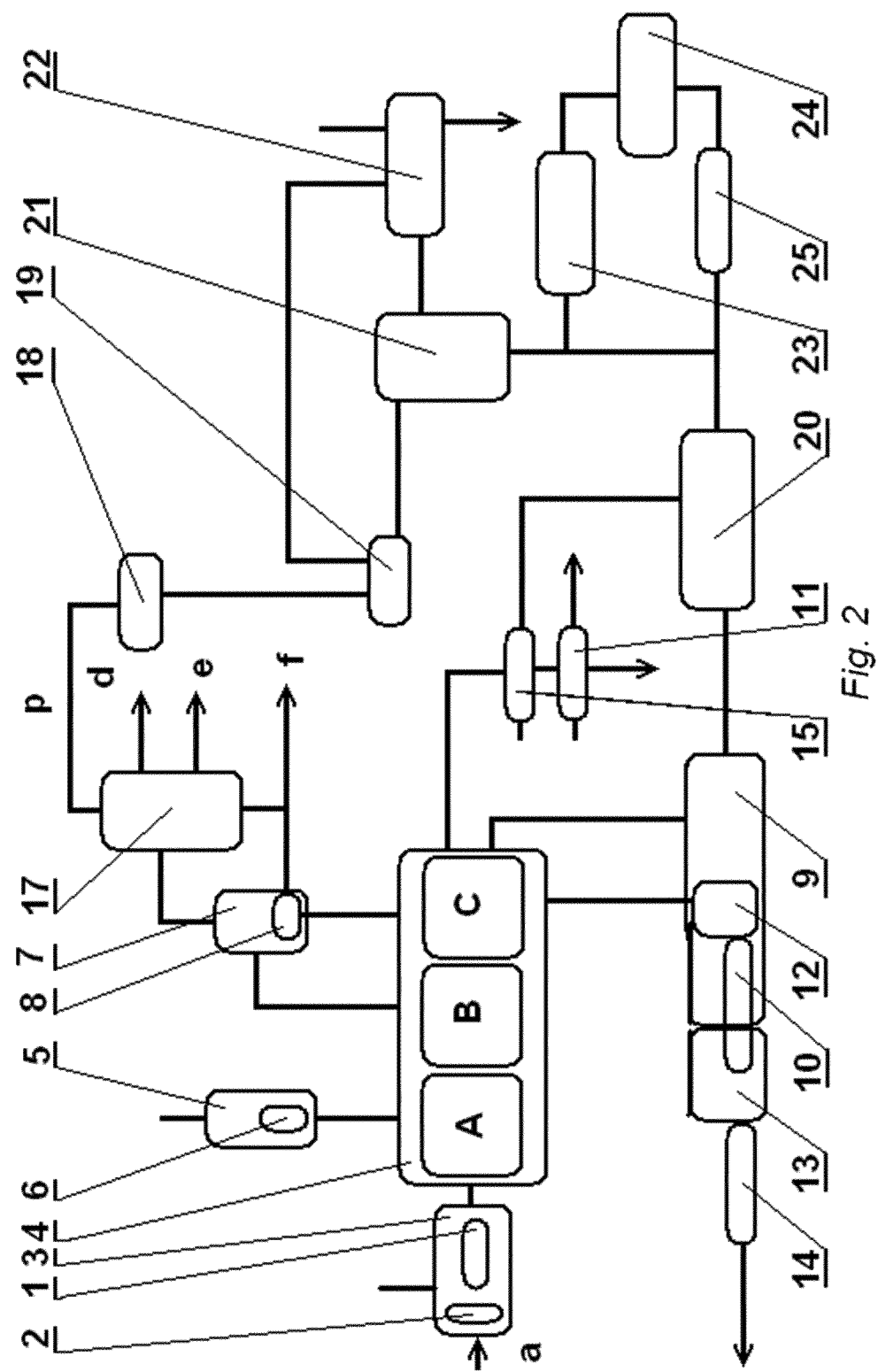
FIG. 2 shows a diagram of an installation with distillation columns.

The invention claimed is:

1. An installation for the production of oil, gas and char for carbon black, from elastomers, characterized in that it has
  a screw dispenser (3) comprising a shaft (1), which from the loading side is closed hydraulically with a lock (2) by nitrogen,
  wherein the screw dispenser (3) is connected with a reactor (4), which is divided into zones A, B, C, corresponding to the subsequent stages of the pyrolysis process: zone A—the beginning of depolymerization (350° C.), zone B—carbonization (350-400° C.) and zone C—aromatic compounds cracking (400-650° C.),
  a bubbler (5) hydraulically closed with a siphon (6),
  a separator (7) with a hydraulic closure (8),
  wherein the bubbler (5) and separator (7) are both installed outside the reactor (4) and are connected to the reactor (4),
    an oil separator (9) installed outside the reactor (4) and connected to the bottom of the reactor (4), wherein the oil separator (9) is equipped with a transport screw (10), and is closed at the outlet by an accumulation shaft (12), and from the side of receiving a solid product it is pneumatically closed with a shaft (13), wherein the shaft (13) is connected to an U-shaped screw conveyor (14),
    a combustion chamber (20) installed outside the reactor (4), wherein the reactor (4) is connected to the combustion chamber (20) via economizers (11, 15), the economizers (11, 15) are also connected with a zone heating jacket of the reactor (4), and wherein the oil separator (9) is heated by exhaust gases fed directly from the pyrolysis gas combustion chamber (20),
    wherein downstream the separator (7) there is a scrubber (16) connected with a vacuum pump (18),
    the vacuum pump (18) is connected to an injector (19), and
  a chemisorption column (21) connected downstream the injector (19), wherein the chemisorption column (21) is also connected to an alkaline solution tank (22) and to a the combustion chamber (20) either directly or via a gas desulphurization system consisting of a compressor (23), a buffer tank (24) and an expander (25).

2. The installation for the production of oil, gas and carbon black from elastomers according to claim 1, characterised in that a distillation column (17) is present in the installation instead of the scrubber (16).

3. A method of production of oil, gas and char for carbon black from elastomers characterised in that
  prepared scraps of car tires, usually containing up to 4% of steel, are fed to a reactor (4) through a screw dispenser comprising a shaft (1), with use of a hydraulic safety lock (2), shutting off gases from the reactor (4) from a feed line,
  wherein nitrogen is constantly introduced into the dispenser to displace air and prevent backflow of material from the reactor (4) to the dispenser (1), and nitrogen is introduced into the reactor (4) in order to eliminate oxidation of char, then material under overpressure is moved through individual zones A, B, C of the reactor (4) counter-current to direction of a heating medium flow, wherein zones A, B and C correspond to the subsequent stages of the pyrolysis process: zone A—the beginning of depolymerization (350° C.), zone B—carbonization (350-400° C.) and zone C—aromatic compounds cracking (400-650° C.), then material descends from bottom of the reactor (4) to a crude coal oil separator (9) heated by exhaust gases fed directly from pyrolysis gas combustion chamber (20) in temperature 850° C. in order to additionally pyrolyze char, which after accumulation, is transported from top by an elevated screw conveyor (10), wherein remaining part is returned to pyrolysis zone from side of the gaseous product receiving through a separator (7) provided with a hydraulic closure (8) in order to prevent carbon black and hydrocarbons having boiling point of over 360° C., from rising, wherein major part of hydrocarbons (m) are taken to a scrubber (16), wherein during production process, economizers (11, 15) organize optimization of use of exhaust gases (o) heat from the combustion chamber (20), wherein in the scrubber (16) pyrolysis gas is separated into fractions: gasoline (d), medium oil (e) and rest of heavy residue above temperature of 360° C. (f), wherein the pressure in the scrubber (16) is controlled by a vacuum pump (18), from which the pyrolysis gas is directed to injector (19) fed either with a stream of water, which simultaneously cools the gas and causes condensation of oil components that pollute the combustion chamber (20) and increase of NOX, or an alkaline aqueous solution drawn from a solution buffer tank (22), causing simultaneous desulphurization carried out in a chemisorption column (21) in a chemisorption process, and from the chemisorption column (21) the gas (r) is directed to into the combustion chamber (20) either directly or via a compressor (23), a gas buffer tank (24) and an expander (25).

4. The method according to claim 3, wherein the hydrocarbons are fed into a the distillation column (17) instead of the scrubber (16).

* * * * *